(12) United States Patent
Saeed et al.

(10) Patent No.: US 12,737,033 B2
(45) Date of Patent: Sep. 15, 2026

(54) POWER MANAGEMENT FOR SYSTEM-ON-CHIP

(71) Applicant: Arm Limited, Cambridge (GB)

(72) Inventors: Sharjeel Saeed, Cambridge (GB); Daren Croxford, Swaffham Prior (GB); Rachel Jean Trimble, Grindleford (GB); Jayavarapu Srinivasa Rao, Cambridge (GB); Sidhartha Taneja, Cambridge (GB)

(73) Assignee: Arm Limited, Cambridge (GB)

(*) Notice: Subject to any disclaimer, the term of this patent is extended or adjusted under 35 U.S.C. 154(b) by 310 days.

(21) Appl. No.: 17/471,314

(22) Filed: Sep. 10, 2021

(65) Prior Publication Data

US 2023/0079975 A1 Mar. 16, 2023

(51) Int. Cl.

*G06F 1/3296* (2019.01)
*G06F 1/329* (2019.01)
*G06F 15/78* (2006.01)
*G06N 3/10* (2006.01)

(52) U.S. Cl.

CPC ............ *G06F 1/3296* (2013.01); *G06F 1/329* (2013.01); *G06F 15/7807* (2013.01); *G06N 3/10* (2013.01)

(58) Field of Classification Search

CPC .... G06F 1/3296; G06F 1/329; G06F 15/7807; G06N 3/10

See application file for complete search history.

(56) References Cited

U.S. PATENT DOCUMENTS 6,304,978 B1 * 10/2001 Horigan .................... G06F 1/26 713/340
7,861,068 B2 * 12/2010 Gorbatov ................ G06F 1/324 712/220
10,620,954 B2 * 4/2020 Beard ................. G06F 9/30105
11,436,145 B1 * 9/2022 Narigapalli ......... G06F 12/0862
2003/0055969 A1 * 3/2003 Begun ................. H04L 67/1001 709/226
2007/0220293 A1 * 9/2007 Takase ................ G06F 9/30181 712/E9.035
2011/0320150 A1 * 12/2011 David ................. G06F 11/3037 702/85
2016/0239065 A1 * 8/2016 Lee ....................... G06F 1/3296
2018/0300605 A1 * 10/2018 Ambardekar ......... G06F 3/0604
2019/0187775 A1 * 6/2019 Rotem .................... G06F 1/324
2019/0205358 A1 * 7/2019 Diril ...................... G06N 3/063
2019/0250691 A1 * 8/2019 Lee ......................... G06N 3/02
2019/0258306 A1 * 8/2019 Croxford ............... G06N 3/045
2019/0340491 A1 * 11/2019 Norden .................... G06N 3/04
2019/0370086 A1 * 12/2019 Heilper .................. G06N 3/063
2020/0175338 A1 * 6/2020 Croxford ............. G06V 10/764
2021/0019633 A1 * 1/2021 Venkatesh .............. G06N 3/063
2021/0103550 A1 * 4/2021 Appu .................... G06F 9/5027
2021/0287031 A1 * 9/2021 Bera ...................... G06V 10/82

(Continued)

*Primary Examiner* — Jaweed A Abbaszadeh
*Assistant Examiner* — Cheri L Harrington
(74) *Attorney, Agent, or Firm* — NIXON & VANDERHYE P.C.

(57) ABSTRACT

A system-on-chip comprises processing circuitry to process input data to generate output data, and power management circuitry to control power management policy for at least a portion of the system-on-chip. The power management circuitry controls the power management policy depending on metadata indicative of a property of the input data to be processed by the processing circuitry.

14 Claims, 7 Drawing Sheets

(56) References Cited

U.S. PATENT DOCUMENTS

| | | | | |
|---|---|---|---|---|
| 2021/0321081 | A1* | 10/2021 | Appelgate ............ | H04N 13/111 |
| 2023/0269422 | A1* | 8/2023 | Randall .................... | H04N 7/18<br>725/151 |

* cited by examiner

POWER MANAGEMENT FOR SYSTEM-ON-CHIP

BACKGROUND

Technical Field

The present technique relates to the field of system-on-chips.

Technical Background

A system-on-chip (SoC) may have power management circuitry to control power management policy for at least a portion of the SoC. For example, power management policy may include controlling the amount of power supplied and/or limiting the activity of the SoC to ensure that the amount of power available is not exceeded. Power management can also help with thermal management of the SoC (e.g. ensuring a mobile device such as a smart phone is not too hot to comfortably use, and that a maximum temperature that the device can operate at is not exceeded) and with prolonging battery lifetime for devices powered by a battery.

SUMMARY

At least some examples provide a system-on-chip comprising: processing circuitry to process input data to generate output data; and power management circuitry to control power management policy for at least a portion of the system-on-chip; in which: the power management circuitry is configured to control the power management policy depending on metadata indicative of a property of the input data to be processed by the processing circuitry.

At least some examples provide a method comprising: controlling power management policy for at least a portion of the system-on-chip; and processing input data to generate output data using processing circuitry of the system-on-chip; in which: the power management policy is controlled depending on metadata indicative of a property of the input data to be processed by the processing circuitry.

Further aspects, features and advantages of the present technique will be apparent from the following description of examples, which is to be read in conjunction with the accompanying drawings.

DESCRIPTION OF EXAMPLES

Figure 1:
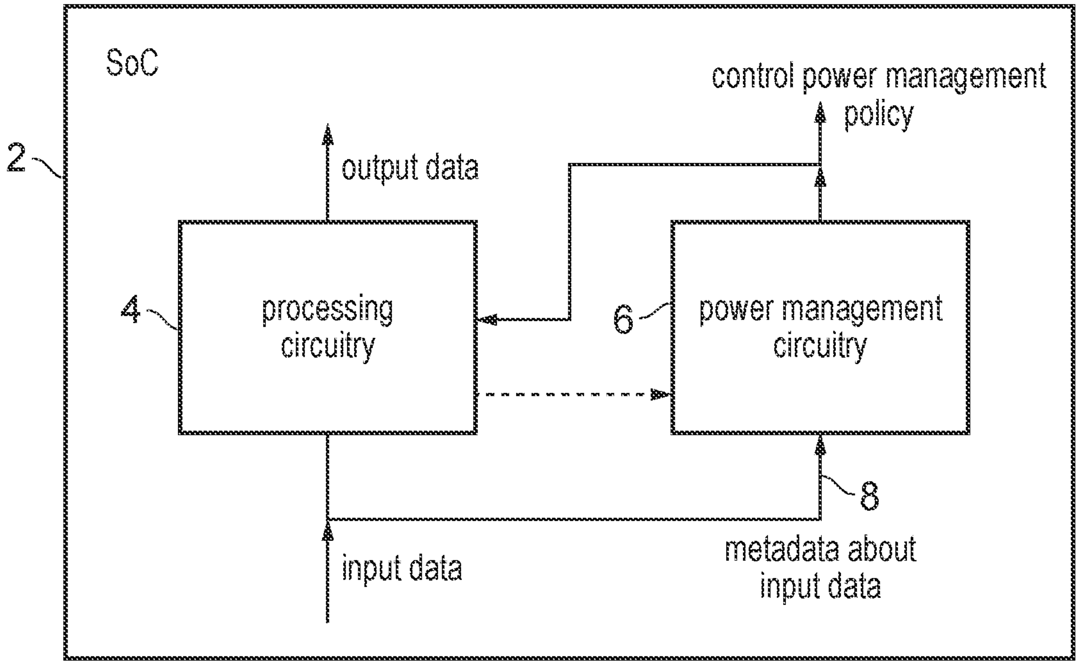
FIG. 1 shows an example of a system-on-chip having power management circuitry and processing circuitry.

A system-on-chip has processing circuitry to process input data to generate output data, and power management circuitry to control power management policy for at least a portion of the SoC. One approach to power management can be to manage supply of power to handle the worst-case power consumption scenario expected during processing. However, with increasing processing performance and higher dynamic range in the power demands expected for different processing scenarios which have different processing requirements and power demands, building for the worst-case power consumption is an increasing challenge because of the cost and effort required. For example, planning for the worst-case power consumption (which may not occur or may occur rarely) at all times may result in more power being consumed than is really necessary which may shorten battery life times and waste energy. Also, planning for worst-case power consumption may require addition of unnecessary hardware resource, increasing circuit area, weight and cost.

In the examples discussed below, the power management circuitry controls the power management policy depending on metadata indicative of a property of the input data to be processed by the processing circuitry. By considering a property of the input data to be processed, when controlling power management policy, a more informed decision can be made which takes into account the specific property of the data which will be processed, which can reduce the need for planning for worst-case power consumption scenarios or allocating a greater power budget for a given processing task than is really needed.

Considering a property of the input data can also have a knock-on effect on processing performance. For example, if the property of the input data is such that it can be processed in a more energy efficient manner then this may leave spare power budget which could be used to perform other tasks, and/or accelerate processing of the task that processes the input data itself, which might not otherwise be possible. This means that performance as a whole can improve, in comparison to the worst case planning approach where (in the absence of knowledge about the input data) the processing of the input data may be assigned a certain power budget for handling the worst case scenario even if the specific input data to be processed could have been processed more efficiently, preventing other tasks being performed with the available power budget.

Hence, in general, by making input-data-dependent decisions on power management policy, this can enable power to be managed for the SoC more efficiently and accurately to improve the balance between energy efficiency, power budget, and performance.

The power management circuitry may select a power management policy setting for a forthcoming (future) period based on the metadata indicative of a property of the input data to be processed by the processing circuitry in the forthcoming period. Hence, the power management circuitry can more accurately predict future needs for power supply or future actions for regulating processing activity when considering the available power supply and energy and power budget, based on metadata about the input data which will be processed in that future period. Hence, by taking a property of the input data awaiting to be processed into account for power management, this can enable more informed decisions to be made, to improve SoC operation.

A variety of properties of the input data could be indicated by the metadata that is taken into account for controlling the power management policy.

In one example, the property of the input data indicated by the metadata may be sparsity of the input data. For example, the sparsity of the input data may be an indication of the fraction of input data values that do not contribute, or make a negligible contribution, to the outcome of processing. The sparsity of the input data could also be an indication of the fraction of input data values which have numeric values indicating that the result of processing can be deduced without requiring an explicit arithmetic operation to be performed on that input data value (in contrast to other numeric values for which that arithmetic operation would be performed). For example, in addition or subtraction operations, input data values of 0 may be considered not to contribute to the outcome of processing, as the outcome of adding 0 to another variable or subtracting 0 from another variable can be determined simply by outputting that other variable, without requiring an arithmetic operation to be performed by an adder circuit. Similarly, for multiplication operations, multiplying a multiplicand by 0 gives 0 regardless of the value of the multiplicand, and multiplying the multiplicand by 1 gives the multiplicand itself, so in both cases there would be no need for a multiply circuit to explicitly calculate the result of a multiply operation. Also, for division operations, if the divisor is 1 then the result can be determined as equal to the dividend, without an explicit division operation being required. In scenarios where the input data has a relatively high fraction of input data values which do not contribute significantly to the result or have numeric values allowing certain arithmetic operations to be suppressed, power can often be saved compared to other input data sets with a greater fraction of input data values which have values which will contribute to the result and do require an arithmetic operation to be explicitly calculated.

In one particular example, the sparsity metadata can indicate the fraction of input data values that are 0. A sparser set of input data (that has a greater fraction of data values set to 0) may be more energy efficient to process than a less sparsely populated set of input data where the fraction of data values that are set to 0 is lower. For example, this could be because some processing circuits may skip processing of data values set to 0 (for example because, in a multiply-accumulate operation for multiplying a multiplier and a multiplicand and adding the product to an accumulator value, a 0 input for the multiplier or multiplicand results in no change to the accumulator value). Even if the processing circuit does not skip over data values set to 0, processing data with a large fraction of 0s may tend to reduce dynamic power consumption because there will be fewer bits on average toggling between 0 and 1 from cycle to cycle. Hence, when the metadata indicates a greater sparsity (higher fraction of zeros) of the input data, then this can allow the power management circuitry to reduce a demand for power supply, increase the throughput of the activity processing the input data or other activities to make use of the spare power budget that would not be required for processing the sparse input data, or carry out other power management actions which may reflect that processing of the spare input data may require less power consumption than if there were fewer zeros in the input data.

The metadata could be indicative of a compression property associated with a compressed version of the input data. Note that the compressed version of the input data could in some cases be the input data that is actually processed by the processing circuitry to generate the output data, but in other cases the processing circuitry may be processing an uncompressed version of the input data, but there may also be a compressed version available, for example if compression is used for the form of the input data that is stored in memory to reduce the memory bandwidth requirements. If a compression scheme is in use then information about a property of the compression may be available as the metadata. Often data which is able to be compressed to a greater extent may also be more efficient to process by the processing circuitry, for example because it may involve greater redundancy so that it may be possible to reuse results of processing obtained for one input data value for another input data value, or because the input data is relatively sparsely populated and so values representing zero could be omitted and not processed. Hence, by taking compression metadata indicative of a compression property associated with a compressed version of the input data into account when making power management decisions, this can improve efficiency of power management. For example, the compression property could be a level of compression associated with the compressed version of the input data. For example, the level of compression could indicate a ratio between the amount of data in the compressed version of the input data and the amount of data in the uncompressed version of the input data. Also, the compression property could an indication of the extent to which values within the uncompressed version of the input data are the same, e.g. a statistic based on run lengths of identical values within the input data (e.g. the average run length, or the fraction of total input data values which are found to be within a run of two or more identical values). It will be appreciated that the specific form of the compression property used may depend on the particular compression scheme being used.

Another example of a property that could be indicated by the metadata may be a range or distribution of numeric values within the input data. If the majority of values within the input data have relatively small numeric values near zero then often these could be more energy efficient to process than data sets including larger magnitudes. This is because (at least for positive numeric values), smaller numeric values will have a greater number of bits set to 0 which means that fewer bits toggle between 0 and 1 when processing those numeric values in an arithmetic operation such as an addition or multiplication (if the data is represented in a sign-magnitude representation, rather than a two's complement representation, this is also true for negative numeric values of small magnitude). Hence, a set of input data with a relatively small numeric range (e.g. with a relatively small maximum value) or a distribution more heavily clustered near zero could allow the power management circuitry to decide that less power will be consumed, allowing the power supply to be reduced or other tasks to be performed with spare power budget. By considering the metadata indicative of a range or distribution of numeric values, this can allow power to be managed more efficiently for the SoC.

Another property that could be indicated by the metadata may be a property of inter-value differences between successive data values of the input data. For example, the inter-value difference could indicate the difference between one value and the next within an input data stream, or could indicate a difference between data values which are at intervals of a specific number of data values within the data stream (for example, values pulled out of input data that will go down the same lane in processing hardware, which may be separated by a certain number of other intervening data values within the input data set). Also, for some workloads such as video processing, the inter-value differences could be motion vectors which could be intra-frame motion vectors representing differences between data values within the same frame, or inter-frame motion vectors representing differences between corresponding pixels of different frames. In general, if an average inter-value difference is lower, this could indicate that the input data will be more efficient to process in terms of power consumption, because it may allow a greater level of compression or reuse of data processing results and/or it will tend to reduce the number of bits which switch between 0 and 1 from one calculation to the next. Therefore, by considering a property of inter-value differences, more efficient use of power can be made based on the power management decisions of the power management circuitry.

Hence, a range of properties of the input data could be indicated by the metadata considered for power management decisions. Any of the examples discussed above could be used either individually or in combination. For example, any one, two or more of these properties could be considered for controlling the power management policy. Other properties of the input data could also be considered.

Regardless of which specific property is considered, a common feature of these properties is that they relate to the specific input data set to be processed, rather than merely relating to the type of processing operation to be performed on that input data. Hence, even when performing exactly the same processing operation, performing that operation on two different input data sets could lead to two different levels of power consumption and so this is why considering a property of the input data when controlling power management policy can be useful.

The input data-dependent control of power management policy can be used for a wide variety of different kinds of processing workloads. Examples can include video encoding/decoding, image processing, display processing, graphics processing, etc.

However, the input data-dependent control of power management policy can be particularly useful in cases where the input data comprises input data for a machine learning workload to be performed by the processing circuitry. Machine learning workloads (e.g., convolutional neural networks in particular) can have several properties which make them extremely well suited to being able to consider metadata regarding a property of the input data when controlling power management policy. Convolutional neural networks may have a number of different layer types, for example convolutional layer, fully connected layer, pooling layer, deconvolution layer. Convolutional layers may particularly benefit from this approach, however other layer types could also benefit.

Firstly, such workloads tend to process input data sets for which a significant amount of the input data may comprise zeros or relatively small numeric values, so there tends to be a reasonable amount of scope for energy efficiency savings by taking into account metadata about sparsity, compression properties, or other data-dependent information when performing processing of such workloads.

Also, with machine learning workloads, the metadata about sparsity, compression, etc. may often already be available for other purposes, such as to allow the processing circuitry to skip processing of elements set to 0 or to reduce memory bandwidth by implementing compression. In typical systems, while this can help power to be saved at the processing circuitry and the memory system, the information on the extent to which that power can be saved when processing a given set of input data would not typically be made available to the power management circuitry which would be controlling power management policy based on a worst case power demand that could arise. In contrast, in the techniques discussed in this application, the metadata on properties of the input data can be exposed to the power management circuitry. Nevertheless, the additional overhead incurred by this use of input-data-dependent metadata for power management policy control may be relatively limited because the metadata may already be available for purposes other than control of power management policy decisions.

Also, such machine learning workloads tend to involve a large amount of data reuse, where the same input data values may be processed a number of times in different combinations. This means that, compared to other types of workloads, the amount of overhead in metadata generation that can be tolerated without unreasonably increasing processing overheads may be greater than for other workloads, because with machine learning workloads the data reuse means that the overhead of generating the metadata may be amortised across multiple instances of reusing the same data.

Also, the total volume of processing in machine learning workloads tends to be high and the processing may be regular/periodic, and the processing is often paralellised (e.g. through use of SIMD operations in a CPU or use of multiple processors in parallel). Therefore, when performing machine learning workloads there can be a sustained period of time when a lot of power is used, and so the worst case power demands and heat generated can be extremely high and so it can be particularly valuable for power management circuitry, when machine learning workloads are processed, to understand more about the expected power needs for a particular input data set so that power policy decisions can be made more efficiently.

Hence, the present technique can be particularly useful when applied to machine learning workloads.

More particularly, use of the input-data-dependent metadata for controlling power management policy can be particularly useful for workloads which implement a convolutional neural network, which can involve a lot of matrix multiplications of input matrices where one matrix being multiplied represents kernel weights and the other matrix being multiplied is an input feature map representing activations that represent the data to be processed using the convolutional neural network. Convolutional neural networks tend to exhibit the properties discussed above (significant amount of data reuse, large fraction of data values set to 0 or small numeric values, and processing data flows which may already involve compression or analysis of sparsity), making them particularly suitable for the techniques discussed here as there are significant opportunities for more efficient power control when a property of the input data can be taken into account by the power management circuitry when controlling power management policy.

Hence, in examples where the input data is input data for a machine learning workload, the property of the input data indicated by the metadata could comprise at least one of: sparsity of non-zero elements of at least one matrix to be processed in the machine learning workload; a compression property (e.g. level of compression) associated with a compressed version of the at least one matrix to be processed in the machine learning workload; a range or distribution of numeric values within the at least one matrix; and a property of inter-value differences between successive data values of the at least one matrix. A machine learning workload (e.g. convolution) may process two inputs in a given convolution/machine learning layer: a kernel representing the transformation functions of that layer and input neural network data or an input feature map representing the information to be processed by that layer. Hence, the "at least one matrix" whose property is indicated by the metadata could be one or both of the kernel matrix and the input matrix.

Hence, when the power management technique discussed above is applied when processing machine learning workloads, in some cases the metadata used may be indicative of a property of kernel weights provided as the input data for a convolutional neural network. The kernel weights may represent the functions which map one layer of input data for the convolutional neural network into output data (the output data can then be used as input data for a subsequent layer). For example, a kernel matrix may define a filter which can be applied to a set of activations in an input feature map. The kernel weights are typically predefined based on the (potentially trained) model used for the convolutional neural network, and so may be known in advance by a compiler and/or driver generating the code for the machine learning workload. This means that the metadata associated with kernel weights can be predefined by the compiler/driver and written to memory and so does not need run time computation, which will tend to make it simpler to consider the metadata about the kernel weights when considering power management (as the runtime overhead can be reduced). For example, the metadata concerning the kernel weights could indicate sparsity of non-zero elements within the kernel weights or other properties such as the level of compression, range or distribution of numeric values and property of inter-value differences, as discussed above.

Also, the metadata could be indicative of a property of input neural network data or at least one input feature map provided as the input data for a convolutional neural network. The input neural network data can be the raw data to be processed by the convolutional neural network, such as one or more images, or a set of sensor data or other data of interest in which patterns are to be detected. An input feature map may represent the data in the form input to a given layer of the convolutional neural network, which is to be processed based on the kernel function defined by the kernel weights. Hence, the input neural network data or input feature map represent the information being processed by the network, rather than representing the mapping functions for mapping between one layer of the network and the next. For example the input feature map at a first layer of the convolutional neural network could be the raw input neural network data itself, or could be a set of features derived by pre-processing or feature selection from the raw input neural network data. For a subsequent layer of the convolutional neural network, the input feature map could be at least a portion of an output feature map generated by an earlier layer of the convolutional neural network.

The nature of the input neural network data or input feature map therefore varies significantly depending on the particular application for which the convolutional neural network has been trained, and unlike the kernel weights will vary from one instance of applying the convolutional neural network to the next depending on the input neural network data supplied for processing. While the input neural network data or input feature map will not typically be known in advance and so computing the metadata indicating a property of the input neural network data or the input feature map may require some runtime performance overhead, in practice as the input neural network data or input feature maps being processed for a convolutional neural network may involve a relatively high volume of data, compression schemes may often be supported to compress the input feature maps when writing feature maps out to memory (this is especially useful when there is not enough capacity for storing feature maps in an on-chip buffer, so feature maps are being written to/read from off-chip memory, in which case the compression can help to reduce the amount of data transferred and reduce energy consumption). Therefore, compression metadata associated with that compression operation could be available which can be supplied to the power management circuitry to enable the power management circuitry to set the power management policy for a future window of time when that input data will be processed. Other properties such as sparsity of the input neural network data or input feature maps, or information on numeric range/distribution or inter-value differences between numeric values could also be computed based on the input neural network data or input feature maps, to enable the metadata used by the power management circuitry to be computed. As there tends to be a lot of data reuse in convolutional neural networks then the overhead associated with generating that metadata can be shared across multiple instances of using the same input data and so may be considered acceptable, even if some of this metadata would not otherwise have been used for purposes other than power management policy control.

Hence, the power management circuitry can use, for control of power management policy: the metadata indicative of a property of the kernel weights; or the metadata indicative of a property of the input neural network data or input feature map; or both metadata indicative of a property of the kernel weights and metadata indicative of a property of the input neural network data or input feature map.

In some examples, the metadata may indicate a global property of a set of input data as a whole.

However, it is also possible to provide portion metadata which is specific to an individual portion of the input data. Hence, the power management circuitry can make separate power management policy decisions for processing of respective portions of the input data, based on portion metadata associated with the respective portions. This can allow more fine-grained control of power management policy so that different power management control settings could be selected when processing one part of the input data compared to another part. For example, the portion metadata could be associated with respective portions of a matrix representing the kernel weights or the input feature map for a convolutional neural network.

Different aspects of the power consumption overhead associated with the input data can be taken into account by the power management circuitry based on the metadata, when controlling power management policy. For example the power management circuitry may determine, based on the metadata associated with the input data to be processed by the processing circuitry, a compute overhead estimate indicative of an estimated overhead associated with computation of the output data based on the input data, and control the power management policy based on the compute overhead.

However, the overhead of actually computing the output data from the input data is not the only source of power consumption which may depend on a property of the input data. While reading of inputs and writing of outputs of processing may be relatively efficient when the inputs/ outputs can be stored in a local buffer close to the processing circuitry, if load/store operations to memory are required then the processing circuitry may sometimes stall while waiting for memory operations, and this may affect power consumption. The property of the input data tracked by the metadata may also affect load/store power consumption. Therefore, the power management circuitry can also determine, based on the metadata associated with the input data to be processed by the processing circuitry, a load/store overhead estimate indicative of an estimated overhead associated with loading the input data or storing the output data, and control the power management policy based on the load/store overhead estimate. Hence, the overheads associated with transferring input data or output data between the processing circuitry and various storage devices (as well as power consumed by the control logic associated with such data transfers) can be taken into account. Again, if data is more sparsely populated or able to be compressed to a greater extent then its transfer to or from the memory system or to external storage may be more efficient than other data sets which are not capable of being compressed to as great an extent or which have a higher fraction of non-zero elements. By taking into account an estimate of the power consumed in performing such load/store operations for a specific set of input data, then this can enable better, more informed, decisions on power management policy. For example, based on the expected memory bandwidth available to the processing circuitry and the compression ratio or other property indicated by the metadata, the power management circuitry can determine whether the processing circuitry will be stalled while waiting for data, and if the processing circuitry will be stalled, energy consumption may be estimated to be lower than if the processing circuitry will not be stalled. This can be taken into account for control of power management policy.

The load/store overhead estimate may take into account the overhead incurred by a variety of different components of a memory system and the memory access infrastructure. For example, the estimated overhead could relate to any one or more of: a load/store unit to control issuing of load/store requests to a memory system; an interconnect to control routing of memory access requests across the system-on-chip; access to on-chip memory storage circuitry; access to off-chip memory storage circuitry; and loss of processing efficiency at the processing circuitry due to load/store delays (with this last option, this recognises that if load/store operations are less efficient and therefore take longer, this may cause delays in performing computations at the processing circuitry, which may also affect the power budget needed at the processing circuitry, so properties of load/store overhead can also affect other components other than the load/store circuitry).

The processing circuitry which executes the workload for processing the input data to generate the output data could be implemented in different ways. System-on-Chips may include a number of types of processing units which may offer different trade-offs between processing efficiency and power when performing certain types of workloads. One type of processing unit may be more specialised for some tasks. Another type of processing unit may be more suited to other tasks. Another type of processing unit may be a general purpose unit designed for general purpose processing.

For example the processing circuitry could be at least one of: a central processing unit (CPU); a graphics processing unit (GPU); a hardware accelerator; and a neural processing unit (NPU). An NPU can also be referred to as a "machine learning processor", a "deep learning processor" or a "machine learning hardware accelerator", for example.

When processing machine learning workloads, some forms of processing circuitry such as the NPU may already be designed to take into account metadata indicating properties of the input data such as sparsity or compression level, so as to enable power to be saved when relatively sparse input data is encountered. For example the NPU (or other types of processing circuitry) could have a function where input values of 0 within the input data are skipped and not explicitly processed when processing the input data set, to allow the processing units which would otherwise process those data values set to 0 to skip to processing the next non-zero value, or be power gated to save power. However, in typical NPUs while this input dependent metadata is used to control the operation of the processing circuitry to increase throughput or save power, this metadata would not be exposed to power management circuitry which is controlling power management policy for the SoC, so power management policy decisions such as regulating the power supply or controlling the extent to which throughput has to be limited to avoid exceeding the power budget would be made independent of the metadata supplied to the NPU. In contrast, with the techniques discussed in this application, the power management policy can be controlled based on the metadata so that more efficient regulation of power management policy is possible.

However, other types of processing circuit may not naturally be designed to consider any metadata associated with input data for a machine learning workload. For example, if a machine learning workload is processed using general purpose instructions from an instruction set architecture on a central processing unit (CPU) then there may not be a machine-learning-specific way of signalling sparse data sets to the CPU. CPU cores tend not to have direct access to the input data, such as input feature maps and weights, for a convolutional neural network and so even when processing relatively sparse input data sets the data operations performed on that data by CPUs may still involve unnecessary processing of zero elements which may cause bit toggling transitions and therefore dissipation of power. Some CPU implementations could analyse the input data before it is processed (e.g. multiplied) and stop the processing (multiplication) if the input value is 0, however in this case the 0 value may still be loaded from memory or fetched from a buffer which may result in wasted power.

To mitigate this, in some examples predicate generating circuitry may be provided to generate predicates, based on the metadata (e.g. compression metadata available from a compression scheme, or metadata on sparsity generated by a data parser operating on the input data). The predicates can be used for processing of predicated instructions to be supplied to the processing circuitry for processing the input data, where the predicates indicate one or more inactive elements of the input data for which processing operations (such as arithmetic operations or load operations) are to be masked. The predicate generating circuitry could be some bespoke hardware circuitry or could be a general purpose processing circuitry which is executing instructions in software which controls the generation of the predicates in response to the metadata. For example, the predicates may be vector predicates which indicates active and inactive elements of vector operands provided for vector instructions being processed by the processing circuitry. With this approach then even if the metadata cannot naturally be supported by the processing circuitry in its initial form, it can be used to form vector predicates which may enable power to be saved at the processing circuitry when data is relatively sparely populated. This enables a general purpose processing unit such as a CPU to benefit from greater power savings when processing sparse data, even if the CPU does not naturally have a mechanism for generating those savings. Meanwhile, the power management circuitry can take the metadata into account for controlling power management policy as discussed above.

A variety of aspects of power management policy could be controlled based on the metadata indicative of a property of the input data. One form of power management policy that could be controlled based on the metadata associated with the input data may be a maximum power mitigation policy. When the maximum power mitigation policy is active, the power management circuitry may select, depending on monitoring of power-intensive events, whether to restrict throughput of the processing circuitry. When throughput is restricted, the number of operations or data values processed in a given period of time is reduced. The throughput that is restricted could be a throughput of instructions processed by the processing circuitry or a throughput of input data processed by the processing circuitry, or both. The restriction in throughput could be achieved in different ways, e.g. by reducing a clock frequency of a clock signal supplied to the processing circuitry, and/or by throttling a rate of issue of operations, instructions or data values to be processed.

The power management circuitry may select a setting for the maximum power mitigation policy depending on the metadata indicative of the property of the input data. The maximum power mitigation policy can be useful to limit the demand for power required by restricting throughput of the processing circuitry depending on the available energy budget and thermal budget, but by taking the property of the input data into account then this can avoid maximum power mitigation policy decisions being overly conservative in cases when the input data properties indicate that processing of the input data may be more energy efficient than a worst case scenario.

Various settings for the maximum power mitigation policy could be adjusted based on the metadata. For example the setting could be at least one of: a setting for controlling detection or weighting of the power-intensive events; at least one comparison criterion for determining, based on the monitoring data, whether to restrict the throughput; and a throughput limit indicative of a maximum throughput allowed when the power management circuitry determines that throughput of the processing circuitry should be restricted.

The control of these settings based on the metadata could be direct, in the sense that based on evaluation of the metadata, specific values for the settings could be selected. Alternatively, a more indirect way of controlling these settings may be implemented, so that for example the maximum power mitigation policy may have a number of modes or "gears" which are available for selection (corresponding to more or less aggressive interventions in limiting throughput, for example) and the analysis of the metadata may cause the maximum power mitigation policy to switch to a different mode or gear. For example, each mode/gear could be associated with different settings, such as the settings for the detection or weighting of the power-intensive events during the monitoring, the at least one comparison criterion and/or the throughput limit. Hence, in some cases the particular mode/gear to be used for a future time window when a given set of input data is to be processed may be selected based on the metadata indicating the property of that given set of input data, and then the selected mode/gear will then implicitly result in a corresponding set of maximum power mitigation settings being selected for that future time window. By adjusting these settings based on the metadata the power management circuitry can better match the expected energy requirements to the amount of energy requested from a regulator.

The particular way in which the maximum power mitigation policy settings are adjusted based on the metadata may depend on the nature of workload being processed, and the type of metadata and power management policy setting being used, but some examples are as follows. In general, the power management circuitry may control the maximum power mitigation policy to favour more strongly restricting the throughput of processing operations, instructions or data when the metadata indicates a first condition than when the metadata indicates a second condition. The first and second conditions may be defined according to any of the following examples:

- in the first condition, the metadata indicates less sparse input data than in the second condition;
- in the first condition, the metadata indicates input data supporting a smaller level of compression than in the second condition;
- in the first condition, the metadata indicates that the input data has a wider range of numeric values than in the second condition;
- in the second condition, the metadata indicates that a distribution of numeric values within the input data is clustered more heavily around zero than in the first condition; or
- in the first condition, the metadata indicates that an average of inter-value differences between successive data values of the input data is greater than in the second condition.

Any one or more of these approaches could be combined in a given implementation. The control algorithm could be a multi-factor algorithm which considers contributions from multiple factors. In general, with these rules for setting maximum power mitigation policy settings, the throughput of the processing circuitry may be more heavily restricted in cases when the metadata indicates input data which is likely to require a greater amount of energy to process, than when the metadata indicates that the input data is likely to require less energy to process.

Another aspect of power management on a SoC may be a policy which aims to limit a rate of change in power requirement. Sudden increases or decreases in activity can cause voltage drops (commonly referred to as "IR drop" because it is caused by the high current flowing through a resistive component when there is a relatively high rate of change in activity). For example, if activity was high and then suddenly becomes low or vice versa then this can cause high currents to flow which may temporarily cause supply voltage to drop, potentially below the minimum voltage level required for safe activity of some hardware circuitry. This can cause brownouts, for example. Also, when activity changes from high to low suddenly, this can cause the supply voltage to glitch, potentially above the safe voltage level at which the hardware can operate, risking corruption of stored data.

To avoid this, power management circuitry can implement a policy trying to limit a range of change in power requirements. In the techniques discussed in this application, this policy can be controlled based on the metadata about the input data to be processed. The power management circuitry may determine, based on the metadata, whether to limit a rate of change in power requirement by adjusting a throughput of the processing circuitry or causing the processing circuitry to perform one or more dummy operations. For example, if the estimated activity in a future period (determined based on the property of the input data) is considered to be too low so that this will cause too large a rate of change when activity was previously high, then the processing circuitry could be controlled to perform one or more dummy operations which are not really required but are being processed solely to reduce the rate of change in power requirement, reducing risk of power supply glitches. Alternatively if activity was previously low and is estimated to become high later, the throughput of the processing circuitry could be throttled to reduce the activity in the future period and again limit the rate of change in power requirement. Either way, by considering the metadata about the input data when considering whether any action is needed to limit the rate of change in power requirement, this can enable more accurate predictions of future workload so that more informed decisions can be made and it is less likely that brownouts occur.

Another form of power management policy that could be controlled depending on the metadata may be dynamic voltage scaling. For example, based on an estimate of the power overheads derived from the metadata associated with the input data, the voltage supply could be adjusted based on the estimated energy requirements for processing of the input data. This can avoid consuming an unnecessarily high amount of power if the input data could be processed more efficiently, helping to save energy.

Another example of a power management policy that could be influenced by the metadata could be selection of how many execution engines are active for processing of the input data. For example the execution engines could be multiple processing circuits of the same type (e.g. multiple CPUs, GPUs or NPUs) or could correspond to individual calculation units within a given processing circuit such as a CPU, GPU or NPU. For example the execution engines could be multiply-accumulate (MAC) units within a CPU, GPU or NPU. By controlling the number of active execution engines based on the property of the input data indicated by the metadata, this can help to enable better power management policy.

Another example of power management policy that could be controlled depending on the metadata may be the issuing of a request to a voltage regulator to request a change in voltage supply. The requested change could either be supply of a greater voltage or supply of less voltage.

Which particular power management policy action is taken may depend on monitoring of power intensive operations performed in the past and based on the power requirement predicted from the metadata to be needed in future. For example, where power requirement is changing, the power management circuitry could issue a voltage regulator request, to request less or more energy. Also, where power requirement is changing, the power management circuitry could limit the processing change based on the capability of the voltage regulator, e.g. by restrict throughput of instructions/computation, restricting number of processing elements operating, or restricting operating frequency of processing elements. Also, where power requirement is (relatively) static (potentially based on the capacity of the power supply, heat dissipation of the device, or required longevity of the battery), the power management circuitry could restrict throughput of instructions/computation, restrict number of processing elements operating, or restrict operating frequency of processing elements.

FIG. 1 shows an example of a system-on-chip (SoC) 2 which comprises processing circuitry 4 and power management circuitry 6. The processing circuitry 4 receives input data and processes the input data to generate output data. The power management circuitry 6 controls power management policy for at least a portion of the SoC 2. For example, the SoC 2 may have a number of power domains and the power management circuitry 6 could control power management policy for a specific power domain (with other separate power management circuitry being provided for controlling other power domains). Alternatively, the power management circuitry 6 could control power management policy for the SoC 2 as a whole. Control signals which influence power management policy may be issued by the power management circuitry 6 to various parts of the SoC 2, including to the processing circuitry 4. For at least some of the power management functions, decisions on power management policy may be made by the power management circuitry 6 based on metadata 8 indicative of a property of the input data to be processed by the processing circuitry 4. By receiving information about the specific input data to be processed, the power management circuitry 6 can better match the expected power requirements predicted to arise when processing the input data with the supply of power available. Optionally, power management decisions can also be dependent on other information, such as information obtained from the processing circuitry 4 (e.g. information indicating occurrence of power hungry events as discussed in more detail with respect to FIG. 8 below).

Figure 2:
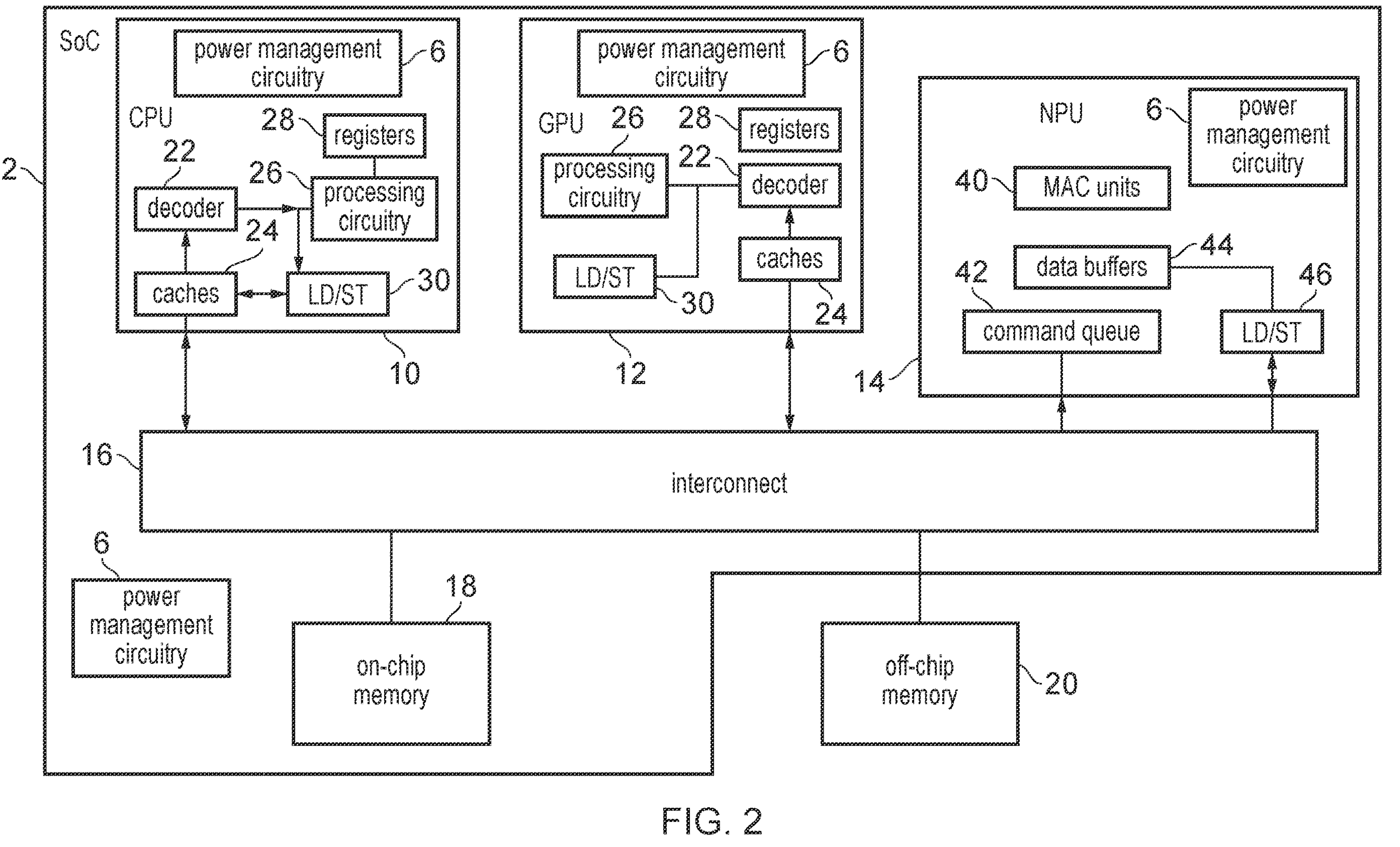
FIG. 2 illustrates a more detailed example of a system-on-chip.

FIG. 2 illustrates a more detailed example of the SoC 2 shown in FIG. 1. It will be appreciated that both FIGS. 1 and 2 are a schematic diagram showing a summary of selected components of the SoC, and that the SoC 2 may have many other components not shown in FIG. 1 for conciseness.

In the example of FIG. 2, the processing circuitry 4 may be a processing unit (which can be one of several different processing units included on the SoC). In this example, the SoC has a central processing unit (CPU) 10, a graphics processing unit (GPU) 12 and a neural processing unit (NPU) 14. Any of these units 10, 12, 14 can be considered to be the processing circuitry 4 shown in FIG. 1. It will be appreciated that while FIG. 2 shows an SoC having all of the CPU 10, GPU 12 and NPU 14, this is not essential and other examples may only have some of these types of processing unit. References to the processing circuitry below may refer to any of these. Also, some SoCs may have more than one processing unit of a given type (e.g. multiple CPUs 10).

The processing units 10, 12, 14 are coupled via an interconnect 16 which controls access to shared memory by the processing units. The shared memory may include on-chip memory storage 18 which is included within the SoC 2 (i.e. on the same integrated circuit as the processing units 10, 12, 14), as well as off-chip memory storage 20 which is external to the SoC 2 (on a different integrated circuit).

The CPU 10 is a processing unit designed to support general purpose processing operations based on instructions defined according to an instruction set architecture. An instruction decoder 22 decodes instructions fetched from caches 24 or from the memory system. Based on the decoded instructions, the instruction decoder 22 controls processing circuitry 26 to perform data processing operations on operands obtained from registers 28 and write the results back to registers. Also, for load/store instructions decoded by the instruction decoder 22, the instruction decoder 22 controls a load/store unit 30 to perform load operations to load data from the memory system (including the caches 24 and memory storage 18, 20) to the registers 28 or store operations to store data from the registers 28 to the memory system 24, 18, 20. Compared to the GPU 12 and NPU 14, the CPU 10 may support a wider range of processing operations but may have fewer resources for executing as many operations in parallel and may be less efficient than the GPU or the NPU for certain workloads for which the GPU or the NPU are more optimised.

Similar to the CPU 10, the GPU may have processing circuitry 26, and instruction decoder 22, caches 24, registers 28, and a load/store unit 30, but the components of the GPU may be more optimised for performing graphics processing, such as shading and rendering operations. Any known GPU design can be used for the GPU 12.

The NPU 14 is an example of a hardware accelerator provided for accelerating machine learning workloads, in particular convolutional neural networks (CNNs). A large amount of the computation overhead of a CNN is in matrix multiplication operations which can be decomposed into a number of multiply-accumulate (MAC) operations, and so the NPU may comprise a number of MAC units 40 for performing multiply-accumulate operations. There may be a large number of these MAC units provided in parallel to enable high volume of data to be processed in parallel. The NPU may have a command queue 42 to which the CPU 10 can send NPU configuration commands, via the interconnect 16. The NPU configuration commands are memory mapped commands and so to issue a particular command to the NPU the CPU 10 may execute a driver which performs a store operation using the load/store unit 30, where the address of the store request is an address allocated for commands for the NPU 14 and the store data to be written in association with a store request may represent the encoding of the command to be acted upon by the NPU 14. For example commands may be defined to set parameters within configuration registers of the NPU 14 which control the operations that are performed by the NPU 14, or to define the addresses of data within the memory system 18, 20 that is to be processed by the NPU, or to represent start/stop commands for triggering the NPU to start or stop processing of a certain amount of input data associated with a particular machine learning model. The NPU 14 may have various data buffers 44 for caching, local to the NPU 14, input data read from the memory system, or for storing outputs of the MAC units 40 which may then serve as further inputs to later MAC operations. The NPU 14 has a load/store unit 46 which may be responsible for controlling transfer of data between the memory system 18, 20 and the data buffers 44 of the NPU 14. In other NPU embodiments, the NPU 14 itself may include a CPU (processor) which controls the operation of the NPU under the control of a driver program executed on the CPU 10.

As shown in FIG. 2, in some cases the power management circuitry 6 shown in FIG. 1 as a single block may in fact be implemented in a distributed manner where a number of components of the SoC 2 each have local power management units. Hence, in FIG. 2 the power management circuitry 6 is shown as a number of blocks distributed across the SoC 2, such as having local power management circuits within the CPU 10, GPU 12 and NPU 14, as well as a component closer to the memory 18 or the interconnect 16.

It will be appreciated that FIG. 2 shows just one example of a possible SoC design, but there can be considerable variation in the particular components included in a SoC. For example, other units capable of requesting access to memory could also be included, such as display controllers, peripheral controllers, network controllers, etc.

Figure 3:
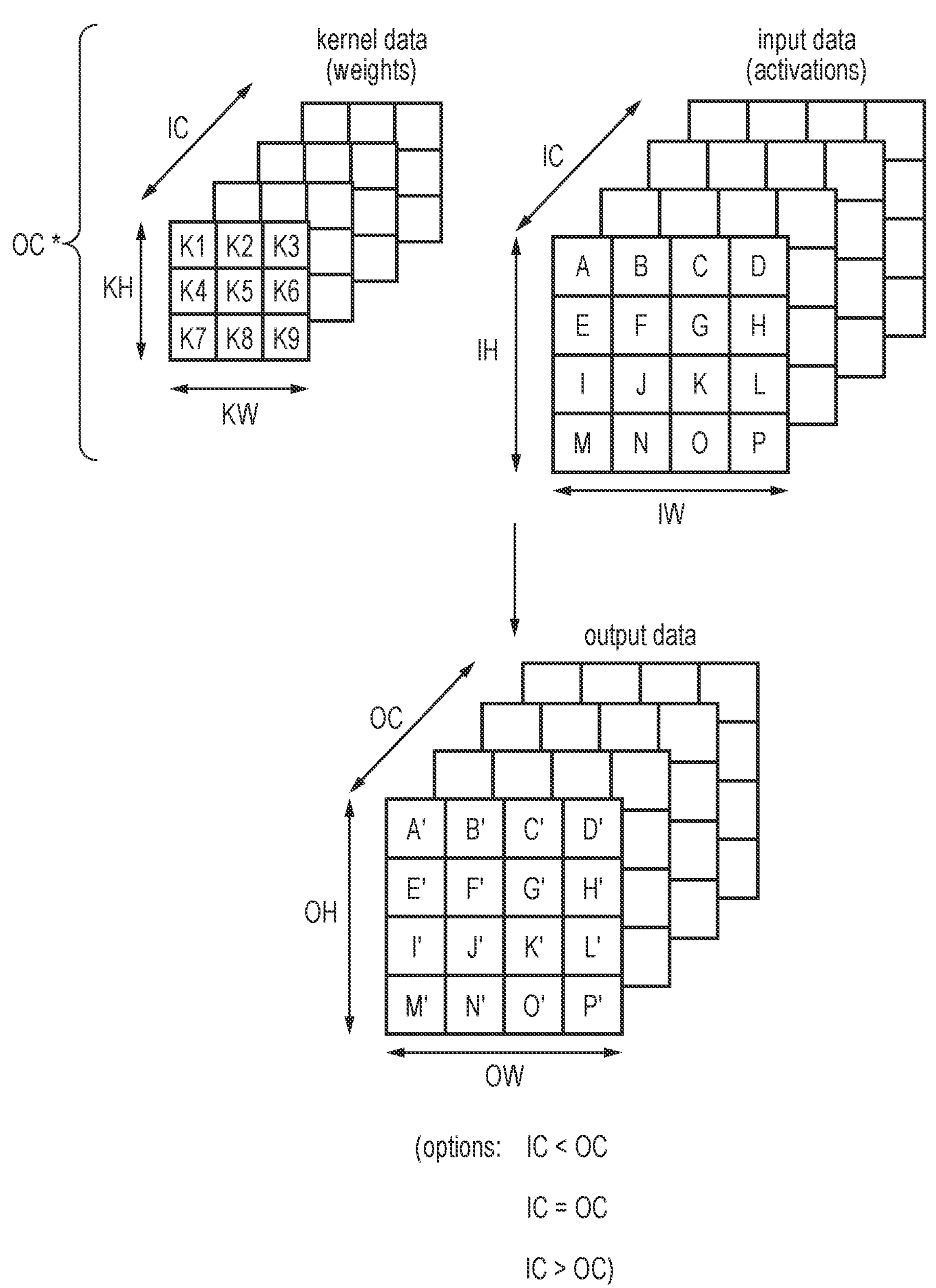
FIG. 3 illustrates an example of a two-dimensional convolution operation for a convolutional neural network.

FIG. 3 shows an example of a convolution operation which is commonly used in convolutional neural networks. Convolutional neural networks may comprise a number of layers of processing, where the data generated by one layer serves as the input to a next layer. FIG. 3 shows an example of an operation which may be performed at a given layer of the network. The input data to that layer (also referred to as activations or input feature maps) may be defined as a number of input channels, where each input channel comprises a 2D array of a certain size. In this example there are IC channels of input data and each channel has a height IH and width IW. In this example IH and IW are both equal to 4.

At a given layer of the neural network, the set of input data is transformed into a corresponding set of output data comprising OC output channels where each output channel is of dimensions OH, OW. In this example OH and OW are also equal to 4 (the same as for the input channels), but this is not essential and other examples could change the channel height/width between the input and the output. Similarly, in this example the number of output channels OC is equal to the number of input channels IC, but this is not essential and OC could be either greater than, equal to, or less than IC.

The function for transforming the input data into the output data is defined by a set of kernel data (or kernel weights). OC sets of IC arrays of kernel weights are defined (so that there are OC*IC arrays in total), and each output channel of output data is formed by processing the corresponding one of the OC sets of kernel arrays and all IC input channels of activations. Each kernel array comprises KH*KW kernel weights—in this example KH and KW are both equal to 3. Hence, in total there are OC*IC*KH*KR kernel weights.

To simplify the explanation, the convolution operation is explained first assuming that IC=1 and OC=1, so that there is only a single kernel array comprising kernel weights K1 to K9, a single input channel comprising input activations A to P and a single output channel comprises output data A' to P' as labelled in FIG. 3. If IC=1, each element of the output data channel may be formed by multiplying the respective kernel weights by the corresponding input activations which are at positions at which the kernel array elements would be positioned if the central kernel weight K5 was positioned over the input data element at the corresponding position to the output data element being generated. For example, when generating the output element F', the kernel array is logically considered to be positioned over the input channel data so that the central kernel element K5 is positioned over the input activation F which corresponds in position to the output element F' being generated, and this means the other kernel weights K1, K2, K3, K4, K6, K7, K8, K9 would be positioned over input activations A, B, C, E, G, I, J, K respectively. Hence, respective multiplications of kernel weights and input activations are performed, to add K1*A+K2*B+K3*C+K4*E+K5*F+K6*G+K7*I+K8*J+K9*K=F'. Hence, the positions to be multiplied with each kernel array element depend on the relative position of these other input activations neighbouring the input activation at the position whose output element is being calculated for the output array. Similarly, when calculating the output element G' then the kernel array would be shifted in position and now the multiplications and sums performed would be to generate G'=K1*B+K2*C+K3*D+K4*F+K5*G+K6*H+K7*J+K8*K+K9*L. In some implementations, the result from the convolution (e.g. F' or G') may be added to a bias, and/or an activation function (e.g. ReLU, Sigmoid etc.) may also be applied.

A similar calculation may be performed for each other position within the output channel. When calculating output elements which are near the edges of the output channel, then when the kernel array is positioned with central element K5 over the corresponding input activation position, some of the elements of the kernel array will extend past the edges of the input channel. In a padded convolution, instead of multiplying these kernel weights by an input value derived from the input feature map, the kernel weights that extend outside the input channel boundary can be multiplied by a padding value such as 0. Alternatively, an unpadded convolution may not calculate any output elements A', B', C', D', E', H', I', L', M', N', O', P' etc. which are at positions which would require the kernel array to extend beyond the bounds of the input channel, and may only produce output data for those positions F', G', J', K' where the kernel can fit entirely within the bounds of the input channel (in this case the dimensions of the output channel may be less than the dimensions of the input channel).

When this operation is scaled up to multiple input channels (IC>1), then there are now IC channels of activations and IC arrays of kernel weights (with a 1:1 mapping between activation channels and kernel weight arrays), and so the single-channel operation described above would be performed for each respective pair of the activation channel and corresponding kernel array, and results obtained for the same position within each set of multiplications added together to form the corresponding element of a single output channel. For example, the value at position F' in the output channel shown in FIG. 3 may correspond to the sum of: the value for position F' resulting from the convolution between kernel array 0 and input data channel 0, plus the value obtained for position F' by convolving kernel array 1 with input data channel 1, plus the value obtained for position F' by convolving kernel channel 2 with input channel 2, and so on until all the input channels IC have been processed (the additions do not necessarily need to be performed in this order—it is possible to rearrange the processing to generate equivalent results).

If the number of output channels is scaled up to be greater than 1, then each output channel is generated by applying the convolution operation described above to the IC input channels, but using a different one of the OC sets of IC kernel channels applied to the IC input channels.

FIG. 3 only shows processing of a 4×4 chunk of the input activation data for a given layer of the neural network. In practice, the input data for a given layer may comprise an array of data of much wider dimensions and there may be many kernels. Also, the neural network as a whole may comprise many layers, so that the output channels from one layer serve as inputs to the next, with different sets of kernel weights learnt by machine learning to provide different transformation functions at different nodes of the network. Hence it can be seen that such neural network as a whole may require an extremely large number of multiplications between different pairs of kernel weights and input activations and additions of these products. The kernel weights and activation values may be multiplied together in many different combinations. For example a given activation A may need to be multiplied by many different kernel weights and a given kernel weight K1 may need to be multiplied with many different activation values. To speed up processing, the kernel weight data and the input activation data can be laid out in memory in structures in a different logical format to the format shown in FIG. 3. For example, the data structures may be structured to allow the multiplications and accumulations needed for a certain layer of the neural network processing to be implemented by performing matrix multiplications, which may be split into simpler operations such as vector outer product operations or vector dot product (or "inner product") operations.

The neural network processing may be implemented in different ways, e.g. using general purpose CPU instructions executed by the CPU 10, or by GPU instructions executed by the GPU 12, or by MAC operations performed using the MAC units 40 of the NPU 14. Regardless of which processing unit performs the processing, an iterative process may be applied in which chunks of input data and kernel weight data are repeatedly loaded from the memory system 24, 18, 20 to the registers 28 or data buffers 44, a series of matrix multiplication operations (e.g. decomposed into vector outer product or dot product operations) are performed on the loaded chunks of data, and results are written back to matrix structures in memory 24, 18, 20.

Hence, many modern neural networks are CNN (Convolutional Neural Networks). These have a large number of convolutional layers and typically comprise >95% of network processing. CNN processing involves a large number of multiply accumulate (MAC), applied on Input Feature Maps (IFMs) and Weight/Kernel data. A significant amount of weight data comprises of 0's or small values. This information is known in advance, so a compiler can write sparsity information as meta-data when writing weights to DRAM (Dynamic Random Access Memory). Similarly, most IFMs tend to significant amount of 0s and small values. For bandwidth savings, many implementations take advantage of these 0s and small values, and compress both the weight data and IFM data. The size of compressed data can be written to DRAM as metadata. Also, CNNs tend to involve a large amount of data reuse, as a given IFM element may be multiplied with many different kernel weights, and a given kernel weight multiplied with many different IFM elements, so the overhead of computing any metadata about properties of the input data can be shared over a large number of instances of reusing the same input data. These properties of CNN processing mean that such workloads are extremely well suited to the consideration of input-data-dependent metadata for controlling power management policy.

Hence, the estimated energy requirement for processing neural network operations may depend on the nature of the input data, and in particular on factors such as the sparsity, level of compression, numeric range or distribution of numeric values, or inter-element differences between numeric values within the input data. Performing CNN processing on one input data set or with one set of kernel weights may consume more power than performing the same CNN processing operation on a different input set or with different kernel weights. By taking metadata indicating a property of the input data into account when deciding a power management policy, this can therefore enable better decisions on how much power budget to request and how best to use the available power budget.

Figure 4:
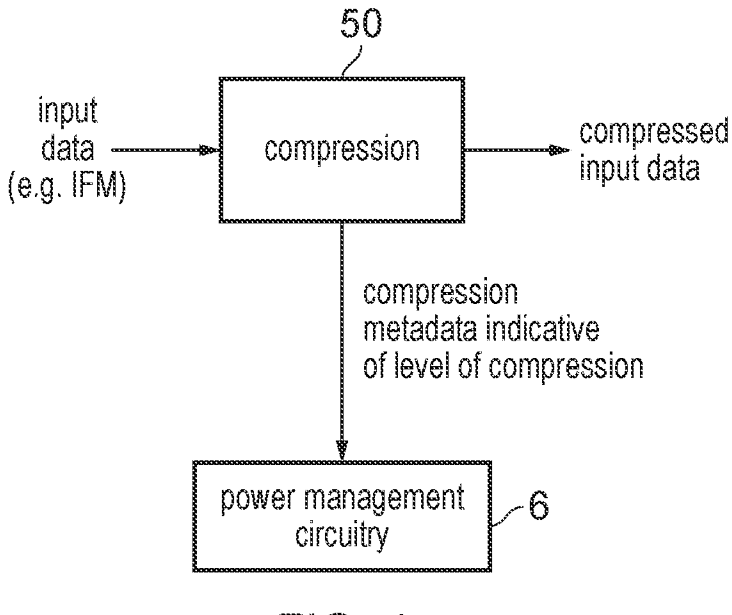
FIG. 4 illustrates use of compression metadata associated with input data, for controlling power management.

FIG. 4 shows a first example where the input data, such as the input feature maps for a neural network, may be subject to a compression scheme 50 to generate compressed input data. For example, if the volume of IFM data to be processed by a CNN is too large to store on-chip then some of it may need to be written to off-chip memory 20 and it can be a waste of energy and memory bandwidth to write a significant number of zeros and relatively small values off-chip. Therefore, the compression 50 can be useful to reduce the bandwidth required for reading and writing data between off-chip memory 20 and on-chip storage 18, 44, 24.

The compression 50 could be performed by one of the processing units 10, 12, 14 or by some dedicated compression hardware provided elsewhere on the SoC 2. When performing a compression, the compression circuitry 50 may generate compression metadata indicating properties of the compression, such as a level of compression achieved when compressing the input data. For example the compression metadata may indicate a compression ratio between the volume of compressed input data and the volume of uncompressed input data, or other properties such as average run length of identical data, average inter-data value difference, or fraction of data values which form part of a run of identical data that could be compressed, etc. When input data is to be processed in a certain future window of time, the compression metadata associated with that input data may be provided to the power management circuitry 6 which may use the compression metadata to determine power management policy settings for that future window of time when the input data will be processed.

Figure 5:
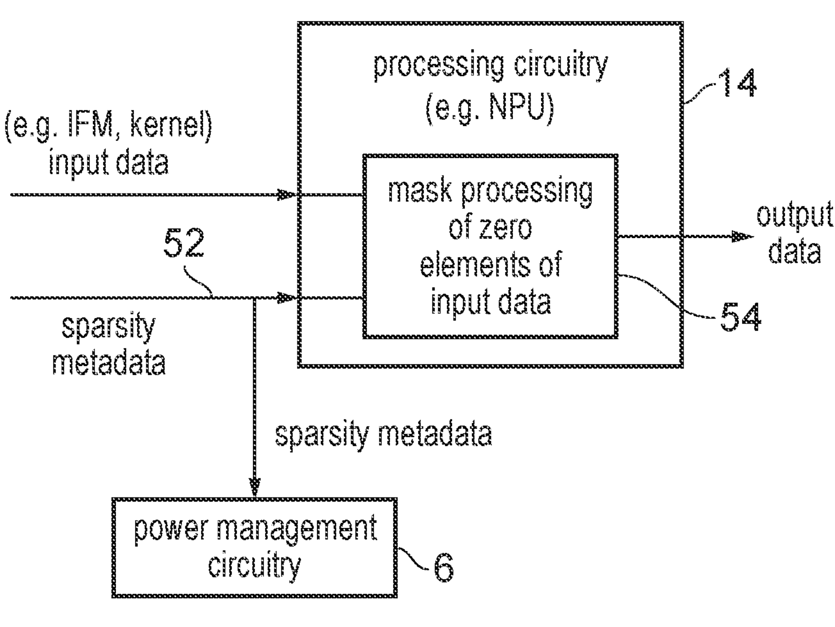
FIG. 5 illustrates use of sparsity metadata indicating sparsity of the input data for controlling power management.

Similarly, FIG. 5 shows an example in which the input data is associated with sparsity metadata 52 which indicates a relative level of sparsity of the input data, such as the IFM or kernel weights for the CNN. In the case of kernel weights the sparsity metadata 52 could be predefined by a compiler which may already know in advance the kernel matrices to be used for a given CNN and can therefore provide the sparsity metadata without requiring any runtime overhead to be consumed in computing the kernel weight sparsity metadata. For the IFM data the particular data being processed by the CNN will not be known in advance, but some software executing on one of the processing units, such as the CPU 10, or a data parser provided in hardware, could parse the input data to be processed to generate sparsity metadata 52 from the IFM data, before that IFM data is supplied for CNN processing. Even if some overhead is incurred in parsing the IFM data, CNNs tend to involve a lot of data reuse and so the overhead of generating the sparsity metadata is shared across many references to the same input data.

Hence, regardless of how the sparsity metadata is obtained, it can be supplied to the power management circuitry 6 which may take it into account when setting power management policy for a window of time in which the corresponding input data will be processed. For example, the power management circuitry 6 may estimate that the power requirement for processing the input data may be lower when the sparsity metadata 52 indicates that there are a relatively high fraction of zeros in the input data.

Other examples of metadata which could be used could be metadata indicating a numeric range associated with the input data, which indicates the difference between the minimum and maximum data values encountered within the input data, or information on a distribution of the input data, such as a statistic such as standard deviation or other indication of the relative breadth of a frequency distribution of the input data. Also, metadata indicating inter-value differences could be used, exploiting the fact that if values tend to remain closer together then fewer bits will switch between processing of one value and the next and so this may consume less energy.

In some cases, the processing circuitry performing the processing operations may have internal logic which is able to respond to cases when there are a significant number of zero elements in the input data to mask off certain processing operations to save power or perform other (more useful) operations, e.g. the next operation performed on a non-zero element. For example, as shown in FIG. 5 the NPU 14 may have masking circuitry 54 which responds to the sparsity metadata 52 to gate off those MAC units 40 which may not be needed to process elements set to zero within the input data, saving power.

Figure 6:
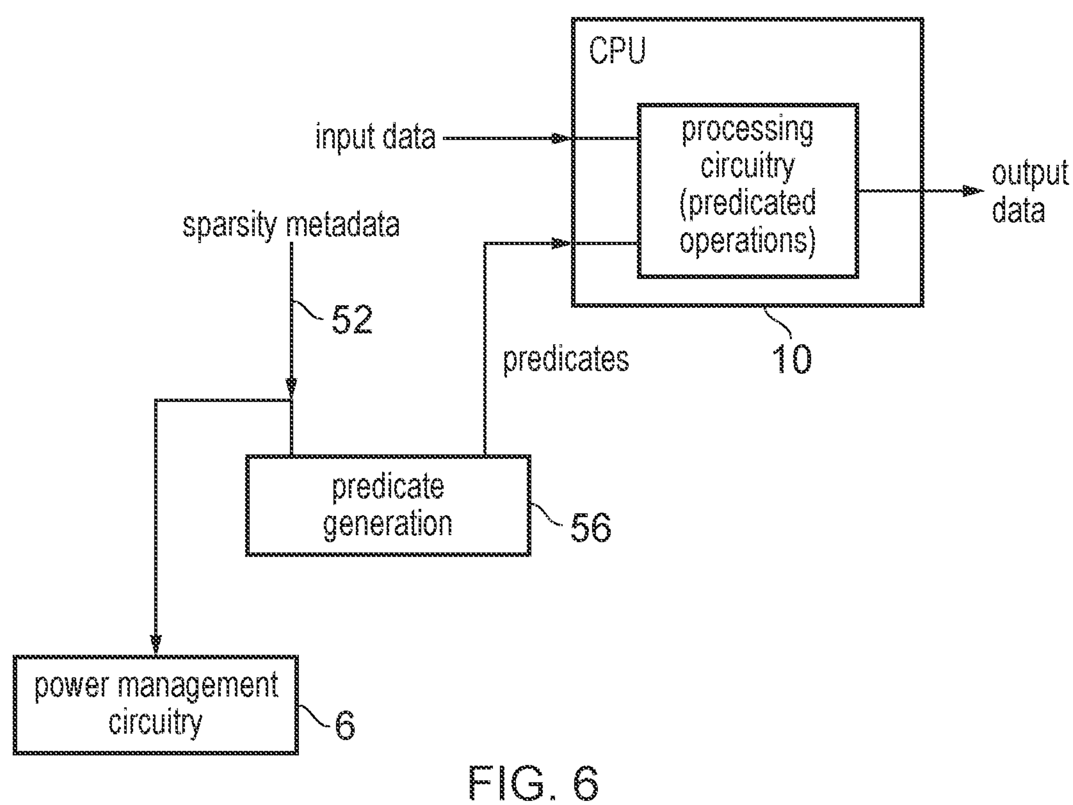
FIG. 6 shows how the sparsity metadata can be used to generate predicates for predicated operations to be performed by a CPU (central processing unit)

However, as shown in FIG. 6, not all processing circuitry may have hardware circuit logic which is able to support using the sparsity metadata itself in order to power gate hardware circuit units. For example, the CPU 10 which is designed for general purpose processing may not have any support for consideration of sparsity metadata relating to input data for a CNN. However, the CPU 10 may have vector processing logic which is able to take, as an input, a predicate value which controls masking of processing of certain elements of a vector operand. Hence, predicate generation circuitry 56 can be provided to convert the sparsity metadata 52 into predicates which can be supplied to the CPU 10 to control predication of vector operations, which may allow further power savings at the CPU based on the sparsity metadata. The predication generation circuitry 56 could be a dedicated hardware circuit logic unit, or could be one of the processing units 10 itself (e.g. the CPU itself) executing software for controlling the generation of the predicates based on the sparsity metadata. Hence, by converting the sparsity metadata into predicates this can allow even a CPU 10 or other processing circuit not specifically designed for handling sparse matrices to be processed in a CNN to save power when possible. This reduces the number of bit value transitions and hence reduces dissipation of power. Meanwhile, the metadata 52 can also be supplied to the power management circuitry 6 so that the sparsity of the input data sets can be taken into account for controlling power management policy.

While FIGS. 5 and 6 show examples where the metadata can be considered to actively control power consumption at the CPU (by power gating of unneeded circuit elements or suppression of unnecessary processing operations, for example), this is not essential, and other forms of processing circuitry which simply process the input data in the same way regardless of the metadata could also be used. Even in that scenario, it can still be useful to supply the metadata to the power management circuitry 6 for controlling power management policy, as the metadata can still be used to deduce that one set of input data may be more power efficient to process than another (e.g. because a sparser data set or a data set with a smaller numeric range of data values may involve less toggling of bits between 0 and 1).

Figure 7:
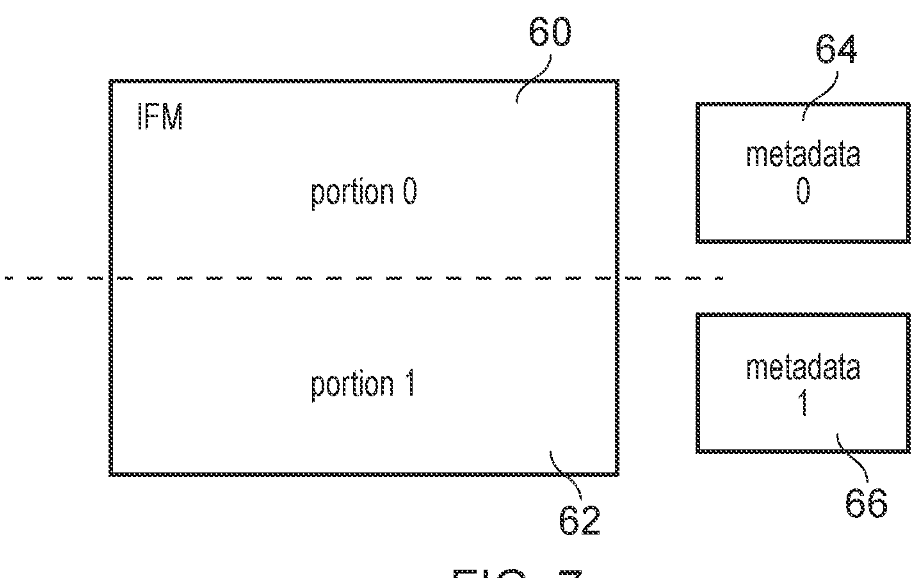
FIG. 7 illustrates how different portions of input data may be associated with portion metadata which can be used by the power management circuitry to make separate decisions on power management policy for processing of the respective portions of the input data.

In the examples discussed above, the metadata is described as being applicable to the input data as a whole, but as shown in FIG. 7 it is also possible to provide separate metadata for specific portions of the input data, such as for different regions of the input feature map supplied to the neural network as shown in FIG. 7. For example, in FIG. 7 the IFM is divided into a top portion 60 and a bottom portion 62 and each of those portions has a corresponding item of metadata 64, 66 respectively. Hence, in a window of time when the top portion 60 will be processed, the power management circuitry 6 may make its power management decisions based on the top portion metadata 64 and in a window of time when the bottom portion 62 is to be processed then the power management decisions can be made based on the bottom portion metadata 66. Of course, it is not necessary to limit the number of portions to two portions, and other examples may provide separate metadata for any number of cells of a given size within the input data.

The separations of the input data into portions could be in any of the dimensions of the input data. FIG. 7 shows an example of partitioning the input data in the height dimension (H), but it would also be possible to partition the input data into portions in the width (W) and depth (D) dimensions shown in FIG. 3. Hence, there are a wide variety of ways in which the input data could be partitioned into portions associated with separate items of metadata.

Also, the input data that is partitioned into the portions could be any of the inputs to the processing operation, e.g. the input feature map (IFM) and/or the kernel weights. It is not essential to apply partitioning to both inputs—in some cases only one of the inputs may be partitioned. Also, it is possible to apply either the same partitioning scheme, or different partitioning schemes for the two inputs. For example, as the IFM may be much larger than the kernel weights, the IFM could be divided into a larger number of portions than the kernel weights.

The particular power management policy implemented by the power management circuitry 6 can vary and even within the same SoC 2 there may be a range of different power management functions which could each consider the metadata associated with the input.

Figure 8:
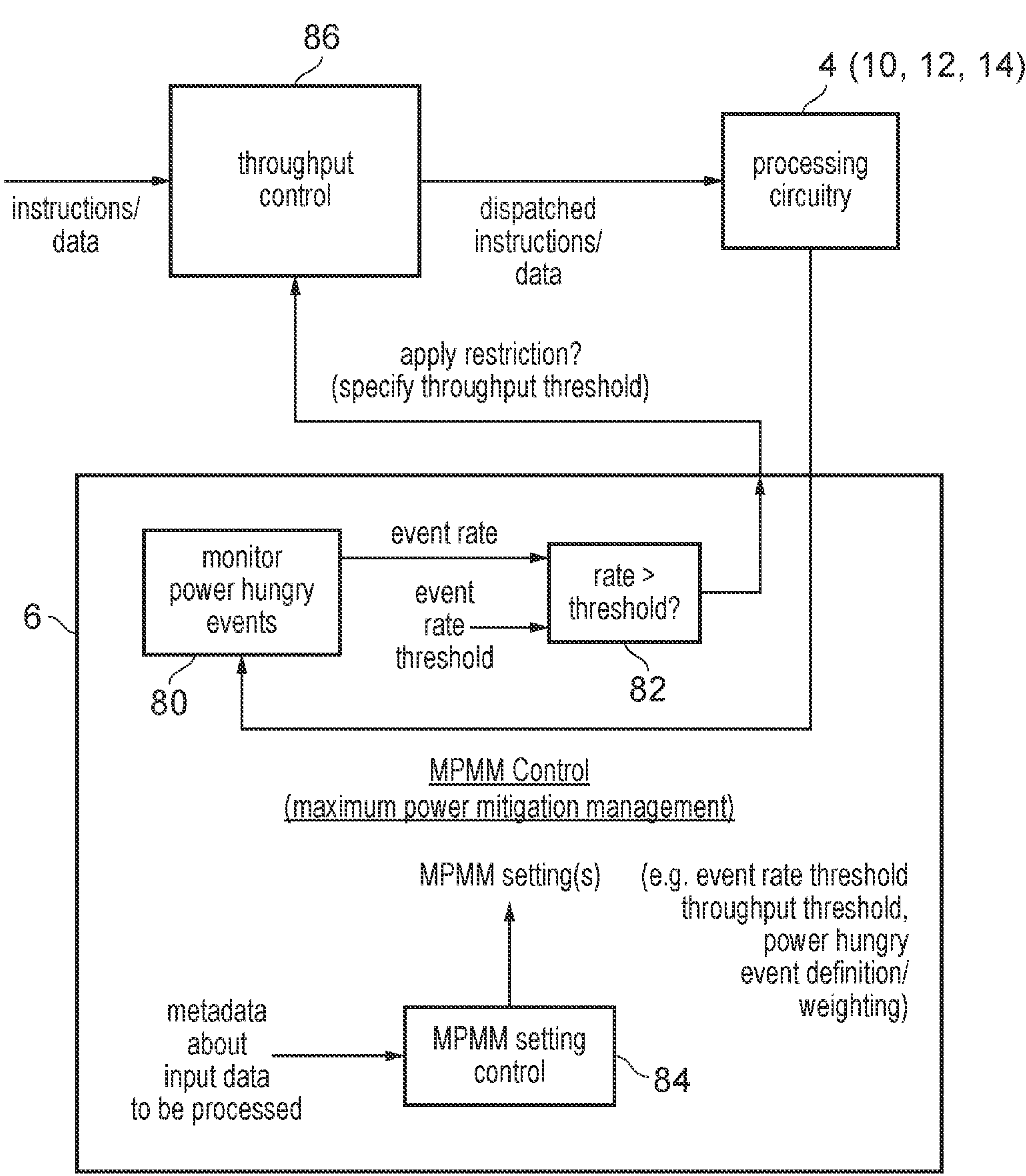
FIG. 8 shows a particular example of control of power management policy, in which a setting for a maximum power mitigation management (MPMM) policy is controlled based on the metadata indicating a property of the input data to be processed.

FIG. 8 shows one particular example of a power management policy, which is a maximum power mitigation management (MPMM) policy. MPMM is a power management feature that detects and limits high energy events. It counts the number of high energy events over each evaluation period and keeps a rolling average across time. If the rolling average exceeds a pre-defined threshold, MPMM can throttle the throughput of the processing circuitry 10, 12, 14, e.g. by throttling dispatch of processing operations or instructions or dispatch of input data to be processed, or by reducing a clock frequency. Another goal of MPMM can be to indicate when more energy is required and submit an appropriate request to the regulator. If the next portion of work requires more energy, MPMM can determine this in advance and put in a request to the regulator, to better match the (expected) energy requirement to the energy request. MPMM can provide a number of "gears" or modes of operations, each with a different triggering threshold and limit to throttling.

In typical MPMM schemes, the control of power management policy would be based on the monitoring of the high energy events that have occurred during the operation of the SoC 2, but would not consider a property of the input data that will be processed in a forthcoming period. However, with the example shown in FIG. 8, metadata about the input data is taken into account for controlling MPMM policy.

Hence, as shown in the example of FIG. 8, the power management circuitry 6 implementing MPMM may have monitoring circuitry 80 for monitoring occurrence of certain power-hungry events occurring on the SoC 2, such as certain types of processing operations which are expected to drain power or out of the ordinary events such interrupts or exceptions. The monitoring circuitry 80 detects these events based on signals received from the processing circuitry 4 indicating the occurrence of these power-hungry events. The particular definition of the power-hungry events may depend on the specific SoC. The frequency of these high energy events may be evaluated across a number of evaluation periods of a given length, and a rolling average may be kept over time, to generate a metric representing the rate of power-hungry events. Different MPMM modes may have different ways of calculating the event rate metric, such as counting different types of events, or assigning different weights to particular events in order to decide how they contribute to the overall metric indicative of power-hungry event rates. Regardless of the particular way in which the metric is generated, comparison logic 82 may compare the event rate metric with a certain threshold, and the comparison may be used to determine whether to apply a restriction in the throughput of instructions or data processed by the processing circuitry 4 (which again could be any of the CPU 10, GPU 12 or NPU 14 described earlier).

The power management circuitry 6 may have MPMM setting control circuitry 84 which uses the metadata related to the input data to be processed by the processing circuitry 4 to control the MPMM settings. The controlled settings could include, for example, the event rate threshold compared against the event rate metric to decide whether to apply a restriction in throughput, or a throughput threshold which represents a limit beyond which further instructions or data should not be dispatched to the processing circuitry 4. For example throughput control logic 86 may be provided in association with the processing circuitry 4 to monitor the rate of instructions or data that have been dispatched to the processing circuitry 4 within a given period so that a flow of instructions or data may be halted or reduced if a restriction needs to be applied to limit the energy consumption based on the monitoring of the power-hungry events by the monitoring circuitry 80. Also, MPMM settings could include the definition of the power-hungry events to be monitored and the weighting that is assigned to particular events when determining the event rate metric. It will be appreciated that other settings could also be controlled based on the metadata about the input data to be processed. In some cases rather than individually selecting a number of different settings based on the metadata, the MPMM setting control 84 could simply shift the MPMM policy between different predefined modes or gears, to implicitly select a corresponding set of settings based on the selected mode.

For example, when a SoC is running a machine learning workload (e.g. CNN), the power management circuitry 6 can use data values for MPMM throttling, as described in following scheme. The processing unit on which this workload is being run could be the CPU 10, GPU 12 or NPU 14. This could involve:

1. Before initiating MAC operations, the MPMM control circuitry (power management circuitry 6) can read in and analyse meta-data about sparsity of weights.
   a. This meta-data could be explicit information written by a compiler/driver to DRAM or registers.
   b. For compressed weights, compression ratio or other compression metadata can provide measure of sparsity of weight data.
2. For higher level of sparsity, MPMM will remain in existing gear.
   a. Higher sparsity will result into typical-case utilization of MAC units, and therefore will not burn significantly higher amounts of power, and or send an appropriate request to the regulator.
3. For low sparsity (smaller fraction of zeroes in the input data), MPMM will move to a higher gear (which imposes a tighter restriction on throughput).
   a. Low sparsity will result into higher utilization of MAC units and more toggling, and therefore will burn higher amounts of power.
   b. By moving into higher gear, MPMM will start throttling issuing of instructions if the power/thermal budget is exceeded, and therefore not cause significant increase in power consumption and/or will send an appropriate request to the regulator.
4. If IFM compression is supported, MPMM can analyse compression ratio of IFMs, and move into further higher gear if compression ratio is not high (i.e. low sparsity).

a. IFMs and Weight kernels are divided into smaller chunks or cells of a given size (W×H×C) and compressed.

b. Metadata of these compressed cells can be used to perform MPMM at regular intervals of time.

c. Metadata of compressed stream or even a parser can be used to parse input IFMs & weights and generate sparsity information of cells.

d. The sparsity information can indicate lower/upper half/whole are zeros which can be used to perform fine-grained control of MPMM.

5. Compression meta data can also be used to determine how much data is required to be fetched from memory, and how much energy is consumed by the loads/store unit, interconnect, memory system, external DRAM. Again, this can be used to modify gear, and/or send a request to the regulator.

6. CPU cores do not tend to have access to the input data—IFMs/Weights. Even with sparsity in IFMs & Weights MAC operations will involve transitions and dissipation of power. To mitigate this issue compression metadata or a data parser can be used to generate predicates which can suppress MAC operations of elements of a vector which will allow to perform MPMM more effectively.

Of course, MPMM is not the only form of power management policy that could be influenced by the metadata associated with the input data to be processed in machine learning workloads. Other types of management policy could also be controlled based on the metadata, such as dynamic voltage or frequency scaling, requests to a voltage regulator for supply of more or less voltage, as well as a scheme for limiting the rate of change of power requirements by monitoring differences over time of expected power requirements and taking action to smooth changes in power demand when required, for example by either throttling the despatch of instructions or data to the processing circuitry 4 or, if activity would otherwise switch from a very high level to a very low level quickly, by generating dummy operations in a processing pipeline to be processed to maintain a certain minimum level of power or to reduce the rate of change of power requirement over time.

Also, it is not essential for the workload for which the metadata is used to control power management to be a machine learning workload. This scheme could be used in other embodiments, for example, video encode/decode, image processing, display processing, graphics processing etc. Compression meta data could be used to determine the amount of energy required to process a region of the data/image. These other types of workloads can also vary their power demands based on the nature of the specific input data being processed and so can benefit from the schemes discussed above.

Figure 9:
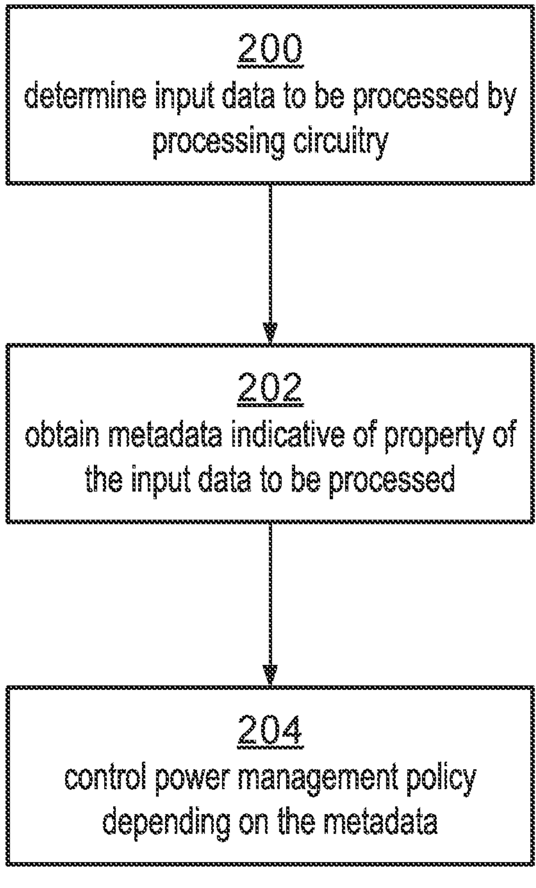
FIG. 9 is a flow diagram illustrating a method for controlling power management for a system-on-chip.

FIG. 9 is a flow diagram illustrating a method of controlling power management. At step 200 the processing circuitry 4 or the power management circuitry 6 determines which input data is to be processed by the processing circuitry 4. At step 202 the power management circuitry 6 obtains metadata indicative of a property of the input data to be processed. The indicated property relates to the specific data values of the input data, (rather than indicating a property of the processing operation that is to be applied to the input data that would be the same regardless of which specific input data is processed by that processing operation). At step 204 the power management circuitry 6 controls power management policy depending on the metadata.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A system-on-chip comprising:

processing circuitry configured to process input data to generate output data; and power management circuitry configured to control power management policy for at least a portion of the system-on-chip, in which the power management policy comprises a maximum power mitigation policy, wherein the power management circuitry is configured to restrict throughput of the processing circuitry in response to determining that a number of monitored power-intensive events over an evaluation period exceeds a pre-defined threshold; in which:

the input data comprises input data for a machine learning workload to be performed by the processing circuitry, wherein the machine learning workload implements a convolutional neural network;

the power management circuitry is configured to control a mode of the maximum power mitigation policy depending on metadata indicative of a property of the input data to be processed by the processing circuitry in the machine learning workload, in which the mode of the maximum power mitigation policy comprises settings for at least one of:

detection or weighting of the power-intensive events; and the pre-defined threshold;

and the power management circuitry is configured to determine, based on the metadata associated with the input data to be processed by the processing circuitry, a load/store overhead estimate indicative of an estimated overhead associated with loading the input data or storing the output data, and control the mode of the maximum power mitigation policy based on the load/store overhead estimate, in which the load/store overhead estimate is indicative of an estimated overhead incurred by at least one of:

a load/store unit configured to control issuing of load/store requests to a memory system;

an interconnect configured to control routing of memory access requests across the system-on-chip;

access to on-chip memory storage circuitry;

access to off-chip memory storage circuitry; and loss of processing efficiency at the processing circuitry due to load/store delays.

2. The system-on-chip according to claim 1, in which the power management circuitry is configured to select a power management policy setting for a forthcoming period based on the metadata indicative of the property of the input data to be processed by the processing circuitry in the forthcoming period.

3. The system-on-chip according to claim 1, in which the metadata is indicative of at least one of:

sparsity of the input data;

a compression property associated with a compressed version of the input data;

a range or distribution of numeric values within the input data; and a property of inter-value differences between successive data values of the input data.

4. The system-on-chip according to claim 1, in which the metadata is indicative of a property of kernel weights provided as the input data for a convolutional neural network.

5. The system-on-chip according to claim 1, in which the metadata is indicative of a property of input neural network data or at least one input feature map provided as the input data for a convolutional neural network.

6. The system-on-chip according to claim 1, in which the power management circuitry is configured to make separate power management policy decisions for processing of respective portions of the input data, based on portion metadata associated with the respective portions.

7. The system-on-chip according to claim 1, in which the power management circuitry is configured to determine, based on the metadata associated with the input data to be processed by the processing circuitry, a compute overhead estimate indicative of an estimated overhead associated with computation of the output data based on the input data, and control the power management policy based on the compute overhead.

8. The system-on-chip according to claim 3, comprising predicate generating circuitry configured to generate, based on the metadata, predicates for predicated instructions to be supplied to the processing circuitry for processing the input data, the predicates indicating one or more inactive elements of the input data for which processing operations are to be masked.

9. The system-on-chip according to claim 1, in which the setting for the maximum power mitigation policy comprises a throughput limit indicative of a maximum throughput allowed when the power management circuitry determines that throughput of the processing circuitry should be restricted.

10. The system-on-chip according to claim 1, in which:

the power management circuitry is configured to control the maximum power mitigation policy to favor more strongly restricting the throughput when the metadata indicates a first condition of the input data than when the metadata indicates a second condition of the input data;

in the first condition, the metadata indicates less sparse input data than in the second condition;

in the first condition, the metadata indicates input data supporting a smaller level of compression than in the second condition;

in the first condition, the metadata indicates that the input data has a wider range of numeric values than in the second condition;

in the second condition, the metadata indicates that a distribution of numeric values within the input data is clustered more heavily around zero than in the first condition; or in the first condition, the metadata indicates that an average of inter-value differences between successive data values of the input data is greater than in the second condition.

11. The system-on-chip according to claim 1, wherein the power management circuitry is configured to control the power management policy by causing the processing circuitry to perform one or more dummy operations, based on the metadata indicative of the property of the input data, to limit a rate of change in power requirement.

12. The system-on-chip according to claim 1, in which the power management policy controlled depending on the metadata comprises dynamic voltage scaling.

13. The system-on-chip according to claim 1, wherein the processing circuitry comprises a plurality of execution engines, and the power management policy controlled depending on the metadata indicative of the property of the input data comprises control of how many of the plurality of execution engines are active.

14. The system-on-chip according to claim 1, in which the processing circuitry comprises at least one of:

a central processing unit (CPU);

a graphics processing unit (GPU);

a hardware accelerator; and a neural processing unit (NPU).

* * * * *